United States Patent Office 2,745,310
Patented May 15, 1956

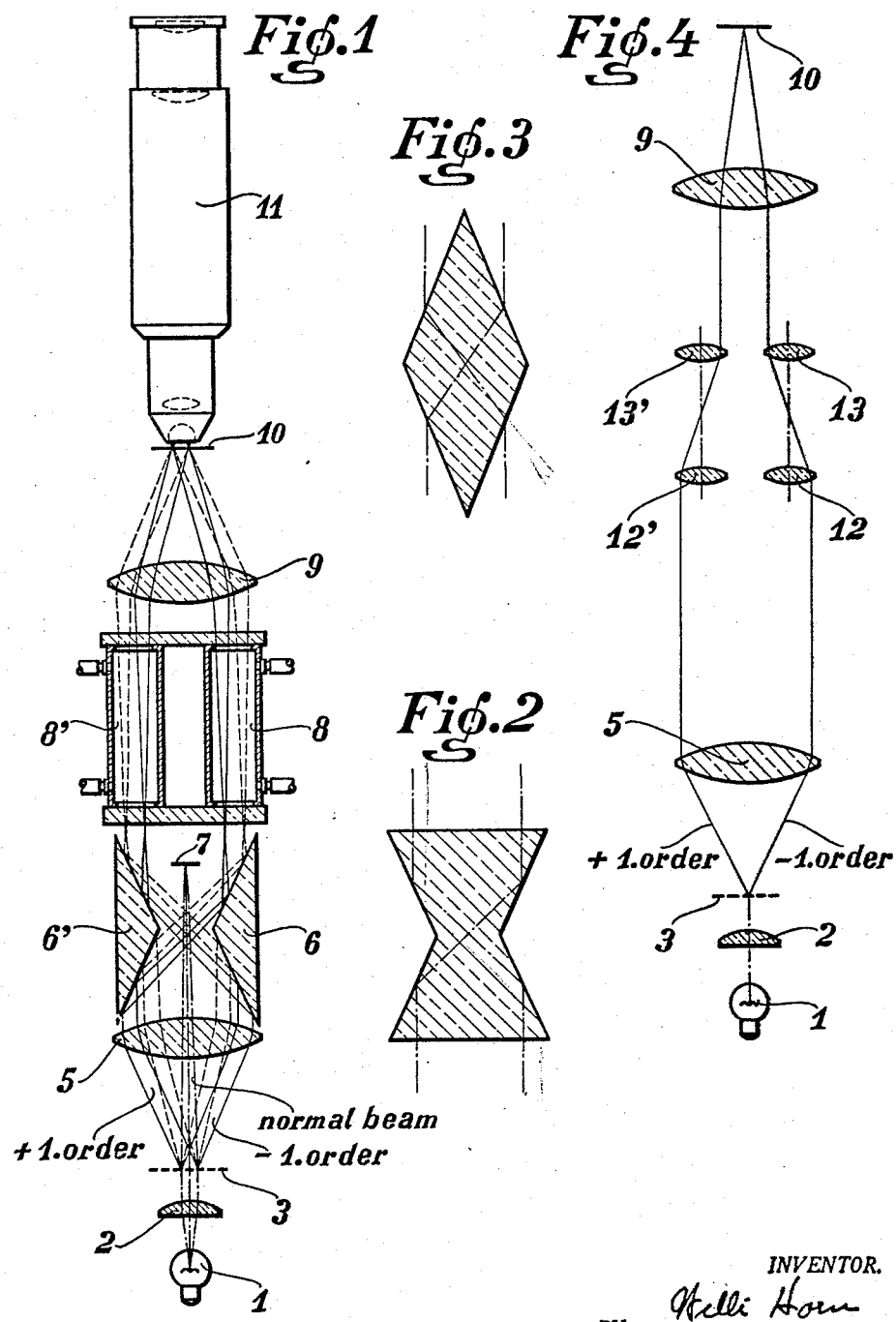

2,745,310

INTERFEROMETER

Willi Horn, Wetzlar, Germany, assignor to Ernst Leitz G. m. b. H., Wetzlar, Germany, a German corporation Application January 29, 1953, Serial No. 334,020

Claims priority, application Germany February 22, 1952

9 Claims. (Cl. 88—14)

The present invention relates to interferometers as they are used, for instance, for the examination of fluids of a gaseous or liquid nature.

A white light source produces interference bands of which the two center bands appear almost black while the other bands have colored rims because of the different positions of the different colored bands. These bands are paler the farther they are removed from the center. The shifting of the interference band fringes is used for measuring the refraction index of the examined material and, the greater the contrast between the center bands and the other bands, the more recognizable is the shifting of the bands.

In my German Patent No. 815,410, I have described an arrangement wherein coherent light beams are produced by a diffraction grating. In this arrangement, two opposite grating spectra of the same order, for instance the spectra or beams of the ±1. order, are used as secondary light sources and brought to interference. This produces a totally achromatic interference band pattern which completely covers the observation or image plane. Shifting of such band pattern is very difficult to recognize so that this interferometer arrangement is practically of no use in the examination of fluids.

The present invention is based on the recognition that the interference of diffraction grating spectra or beams can be used not only to produce achromatic interference band patterns but also to magnify the color deviations of the bands. The colored rims of the bands are widened so that the superimposition of the colors is increased until only the two black center bands are visible while the other bands almost disappear, i. e. become white. This may be accomplished by reversing the color arrangement in both grating spectra or beams which are brought into interference. Thus, the red rays will lie nearer to the optical axis than the violet rays while, in normal grating spectra, the violet rays lie nearer the optical axis than the red rays.

The above object is accomplished in accordance with the invention by providing an interferometer comprising a light source, a diffraction grating illuminated by the light source for producing coherent beams, and an optical reversing system, for instance mirrors, prisms or lenses, for transposing the colors in the two grating spectra. A vessel containing the test fluid may be placed in the path of one of the beams while a compensatory vessel may be placed in the other beam path, if desired.

The various objects, features and advantages of this invention will become more apparent in connection with the following detailed description of some preferred embodiments thereof, taken in conjunction with the accompanying drawing, wherein Fig. 1 represents a schematic side view of an interferometer arrangement in accordance with one embodiment of the invention;

Figs. 2 and 3 show different optical reversing elements which may be used in lieu of the reversing system shown in Fig. 1; and Fig. 4 represents a schematic side view of an interferomter arrangement showing yet another embodiment of optical reversing elements.

Referring now to the drawing, wherein like reference characters indicate like parts in all figures, Fig. 1 shows a light source 1, such as a lamp, and a condenser 2 which parallellizes the light beams emanating from the lamp. The parallel light beams enter diffraction grating 3. The drawing shows the beams of the ±1. order leaving the grating, the outer red rays being shown in full while the inner blue rays are shown in broken lines. Lens 5 serves to parallelize the axes of the beams coming from the grating, while the beams themselves are made convergent by the lens. Following the lens 5, there is shown an optical reversing system comprising two mirrors 6, 6'. As clearly shown in the drawing, each beam coming from the lens is projected to the other side of the optical axis so that the beams leave the mirrors with the red rays being on the inside and the blue rays on the outside. As shown, the normal beam is absorbed by stop 7.

Vessels 8, 8' are placed in the path of the beams coming from mirrors 6, 6' and the beams are combined by lens 9 in observation or image plane 10 where they form an interference pattern. As shown in Fig. 1, the interference pattern in the observation or image plane may be viewed by a microscope 11, indicated by lenses 12, or it may be photographed or observed in any other conventional manner.

Mirror arrangement 6, 6' may be replaced by reversing prism arrangements which are well known per se and examples of which are illustrated in Figs. 2 and 3.

As schematically shown in Fig. 4, the mirrors may also be replaced by a lens reversal system which accomplishes the reversal of the color positions. In this embodiment of the invention, the reversal is caused in each beam and the beams themselves do not change their position in relation to the optical axis. The reversal is accomplished by reversing lenses 12, 12' and 13, 13' placed in the path of the beams.

While the invention has been described with reference to some now preferred embodiments, it should be clearly understood that these have been given merely for purposes of illustration and not as limitations upon the spirit and scope of the invention as defined in the appended claims.

What is claimed is:

1. An interferometer with a diffraction grating for producing coherent light beams, each beam forming a grating spectrum, comprising optical reversing means for reversing the position of the colors in each spectrum, and optical means for combining the beams into an interference band pattern in a plane, the colored rims of the interference bands being so widened that all except the two center bands which are almost achromatic complement each other to appear almost white by superimposition of the colored rims of the spectra.

2. An interferometer as defined in claim 1, wherein the optical reversing means is a reversing mirror arrangement.

3. An interferometer as defined in claim 1, wherein the optical reversing means is a reversing prism arrangement.

4. An interferometer as defined in claim 1, wherein the optical reversing means is an arrangement of reversing lenses.

5. An interferometer as defined in claim 1, comprising vessels containing fluids, said vessels being placed in the path of each of said beams emerging from the optical reversing means.

6. An interferometer with a diffraction grating for producing coherent light beams, each beam forming a grating spectrum, comprising an objective for parallellizing opposite beams of the same order which diverge from the diffraction grating, optical reversing means for reversing the position of the colors in each of said parallellized spectra, a vessel containing a fluid in the path of each beam emerging from the optical reversing means, and a second objective for combining the beams into an interference band pattern in an image plane, the colored rims of the interference bands being so widened that all except the two center bands which are almost achromatic complement each other to appear almost white by superimposition of the colored rims of the spectra.

7. An interferometer as defined in claim 6, wherein the optical reversing means is a reversing mirror arrangement.

8. An interferometer as defined in claim 6, wherein the optical reversing means is a reversing prism arrangement.

9. An interferometer as defined in claim 6, wherein the optical reversing means is an arrangement of reversing lenses.

References Cited in the file of this patent

UNITED STATES PATENTS 2,601,175    Smith _____ June 17, 1952

FOREIGN PATENTS 355,911    Great Britain _____ Sept. 3, 1931